US008554265B1

(12) United States Patent
Buchanon (10) Patent No.: US 8,554,265 B1
(45) Date of Patent: Oct. 8, 2013

(54) DISTRIBUTION OF USER-GENERATED MULTIMEDIA BROADCASTS TO MOBILE WIRELESS TELECOMMUNICATION NETWORK USERS

(75) Inventor: Phillip Buchanon, Buchanan, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 730 days.

(21) Appl. No.: 11/623,921

(22) Filed: Jan. 17, 2007

(51) Int. Cl.
*H04B 7/00* (2006.01)

(52) U.S. Cl.
USPC ....................................................... 455/523

(58) Field of Classification Search
USPC ........................................................ 455/523
See application file for complete search history.

(56) References Cited

U.S. PATENT DOCUMENTS

| | | | | |
|---|---|---|---|---|
| 5,455,823 A * | 10/1995 | Noreen et al. | ............... | 370/312 |
| 5,689,245 A * | 11/1997 | Noreen et al. | ........... | 340/825.49 |
| 6,505,160 B1 * | 1/2003 | Levy et al. | ..................... | 704/270 |
| 6,578,047 B1 * | 6/2003 | Deguchi | ...................... | 707/104.1 |
| 6,829,368 B2 * | 12/2004 | Meyer et al. | ................... | 382/100 |
| 7,113,739 B2 * | 9/2006 | Kawamata et al. | .......... | 455/3.02 |
| 7,149,503 B2 * | 12/2006 | Aarnio et al. | ............. | 455/414.1 |
| 7,171,018 B2 * | 1/2007 | Rhoads et al. | ................ | 382/100 |
| 7,209,900 B2 * | 4/2007 | Hunter et al. | ................... | 705/58 |
| 7,231,176 B2 * | 6/2007 | Levy | ........................... | 455/3.01 |
| 7,274,949 B2 * | 9/2007 | Tanaka | ....................... | 455/556.1 |
| 7,349,552 B2 * | 3/2008 | Levy et al. | .................... | 382/100 |
| 7,359,375 B2 * | 4/2008 | Lipsanen et al. | ............. | 370/355 |
| 7,370,016 B1 * | 5/2008 | Hunter et al. | ................... | 705/57 |
| 7,373,109 B2 * | 5/2008 | Pohja et al. | .................. | 455/41.2 |
| 7,382,259 B2 * | 6/2008 | Yun | ............................ | 340/572.1 |
| 7,412,534 B2 * | 8/2008 | Tsang et al. | .................. | 709/231 |
| 7,519,322 B2 * | 4/2009 | Brown et al. | ................. | 455/3.01 |
| 7,536,188 B1 * | 5/2009 | Fegan et al. | ................. | 455/456.1 |
| 7,552,175 B2 * | 6/2009 | Luo et al. | ....................... | 709/205 |
| 7,567,178 B2 * | 7/2009 | Boyer et al. | ............... | 340/572.1 |
| 7,583,957 B2 * | 9/2009 | Lee | ............................ | 455/414.3 |
| 7,587,752 B2 * | 9/2009 | Nagaraj et al. | ..................... | 726/2 |
| 7,589,616 B2 * | 9/2009 | Klatsmanyi et al. | ......... | 340/10.1 |
| 7,603,321 B2 * | 10/2009 | Gurvey | ........................... | 705/65 |
| 7,627,091 B2 * | 12/2009 | Becker et al. | .................... | 379/37 |
| 7,636,793 B1 * | 12/2009 | Friedman | ...................... | 709/246 |
| 7,640,293 B2 * | 12/2009 | Wilson et al. | ................. | 709/203 |
| 7,650,010 B2 * | 1/2010 | Levy et al. | .................... | 382/100 |
| 7,660,572 B2 * | 2/2010 | Bucher et al. | ................. | 455/405 |
| 7,686,215 B2 * | 3/2010 | Jones et al. | .................... | 235/380 |
| 7,738,634 B1 * | 6/2010 | Sadot et al. | ...................... | 379/45 |
| 7,765,245 B2 * | 7/2010 | Nichols et al. | ................ | 707/825 |
| 7,783,249 B2 * | 8/2010 | Robinson | ..................... | 455/3.06 |
| 7,817,587 B2 * | 10/2010 | Vasa et al. | ..................... | 370/310 |
| 7,865,397 B2 * | 1/2011 | Makeev et al. | ............ | 705/14.71 |

(Continued)

FOREIGN PATENT DOCUMENTS

WO WO 2006048819 A1 * 5/2006

*Primary Examiner* — Hai V Nguyen
(74) *Attorney, Agent, or Firm* — Hartman & Citrin LLC (57) ABSTRACT

Subscriber-generated broadcasts are distributed to mobile wireless devices in a mobile wireless telecommunication network. The network assists the subscriber in creating a broadcast by, for example, compiling one or more media content items of the subscriber's choosing, such as pre-recorded songs, the subscriber's recorded voice, sound effects, etc. The network stores the broadcast representation in a manner that allows it to be retrieved using a unique broadcast identifier. When the network receives the broadcast identifier from a user of a mobile wireless device, the network uses the broadcast identifier to retrieve the stored broadcast representation and transmit its associated media content to the mobile wireless device.

23 Claims, 8 Drawing Sheets

(56) References Cited

U.S. PATENT DOCUMENTS

| | | | |
|---|---|---|---|
| 7,917,550 B2* | 3/2011 | Nichols et al. | 707/805 |
| 7,917,553 B2* | 3/2011 | Nichols et al. | 707/825 |
| 7,959,065 B2* | 6/2011 | Rosenblatt et al. | 235/375 |
| 7,961,212 B2* | 6/2011 | Woodworth et al. | 348/14.01 |
| 7,962,154 B2* | 6/2011 | Nakakita et al. | 455/456.1 |
| 7,983,700 B2* | 7/2011 | An | 455/466 |
| 7,995,992 B2* | 8/2011 | Bucher et al. | 455/408 |
| 8,020,762 B2* | 9/2011 | Jones et al. | 235/380 |
| 8,037,157 B2* | 10/2011 | Xiao et al. | 709/218 |
| 8,046,689 B2* | 10/2011 | Naik et al. | 715/727 |
| 8,056,101 B2* | 11/2011 | Gibbon et al. | 725/46 |
| 8,108,378 B2* | 1/2012 | Ott et al. | 707/707 |
| 8,166,305 B2* | 4/2012 | Martinez | 713/176 |
| 8,176,417 B2* | 5/2012 | Underhill et al. | 715/243 |
| 8,281,348 B2* | 10/2012 | Carhart et al. | 725/86 |
| 8,286,206 B1* | 10/2012 | Aaron et al. | 725/46 |
| 8,346,798 B2* | 1/2013 | Spiegelman et al. | 707/770 |
| 2001/0041047 A1* | 11/2001 | Kawajiri | 386/46 |
| 2002/0072982 A1* | 6/2002 | Barton et al. | 705/26 |
| 2002/0087974 A1* | 7/2002 | Sprague | 725/32 |
| 2002/0092024 A1* | 7/2002 | Nagaoka et al. | 725/62 |
| 2002/0111912 A1* | 8/2002 | Hunter et al. | 705/52 |
| 2002/0146122 A1* | 10/2002 | Vestergaard et al. | 380/231 |
| 2002/0183059 A1* | 12/2002 | Noreen et al. | 455/427 |
| 2002/0199198 A1* | 12/2002 | Stonedahl | 725/86 |
| 2003/0051252 A1* | 3/2003 | Miyaoku et al. | 725/109 |
| 2003/0054758 A1* | 3/2003 | Kawamata et al. | 455/3.04 |
| 2003/0065802 A1* | 4/2003 | Vitikainen et al. | 709/231 |
| 2003/0108022 A1* | 6/2003 | Yamamoto | 370/338 |
| 2003/0114145 A1* | 6/2003 | Boda et al. | 455/412 |
| 2003/0129941 A1* | 7/2003 | Kawamata et al. | 455/3.02 |
| 2003/0194977 A1* | 10/2003 | Videtich et al. | 455/186.1 |
| 2004/0002305 A1* | 1/2004 | Byman-Kivivuori et al. | 455/41.2 |
| 2004/0015553 A1* | 1/2004 | Griffin et al. | 709/206 |
| 2004/0023686 A1* | 2/2004 | King et al. | 455/550.1 |
| 2004/0063441 A1* | 4/2004 | Diao et al. | 455/456.1 |
| 2004/0087273 A1* | 5/2004 | Perttila et al. | 455/41.2 |
| 2004/0117684 A1* | 6/2004 | Chamberlain | 713/401 |
| 2004/0128324 A1* | 7/2004 | Sheynman et al. | 707/200 |
| 2004/0133524 A1* | 7/2004 | Chamberlain | 705/60 |
| 2004/0142656 A1* | 7/2004 | Bensimon et al. | 455/3.06 |
| 2004/0157622 A1* | 8/2004 | Needham | 455/456.1 |
| 2004/0185900 A1* | 9/2004 | McElveen | 455/556.1 |
| 2004/0192267 A1* | 9/2004 | Kettunen et al. | 455/414.1 |
| 2004/0198309 A1* | 10/2004 | Duvall | 455/404.1 |
| 2004/0202329 A1* | 10/2004 | Jung et al. | 380/273 |
| 2004/0242203 A1* | 12/2004 | Lipsanen et al. | 455/412.1 |
| 2004/0249768 A1* | 12/2004 | Kontio et al. | 705/65 |
| 2005/0014463 A1* | 1/2005 | Shin | 455/3.01 |
| 2005/0043020 A1* | 2/2005 | Lipsanen et al. | 455/422.1 |
| 2005/0054351 A1* | 3/2005 | McAlexander | 455/456.1 |
| 2005/0060299 A1* | 3/2005 | Filley et al. | 707/3 |
| 2005/0091683 A1* | 4/2005 | Sheynman et al. | 725/34 |
| 2005/0125302 A1* | 6/2005 | Brown et al. | 705/26 |
| 2005/0176366 A1* | 8/2005 | Levy | 455/3.06 |
| 2005/0203992 A1* | 9/2005 | Tanaka et al. | 709/203 |
| 2005/0210526 A1* | 9/2005 | Levy et al. | 725/113 |
| 2005/0267817 A1* | 12/2005 | Barton et al. | 705/26 |
| 2006/0039307 A1* | 2/2006 | Seo | 370/312 |
| 2006/0057956 A1* | 3/2006 | Grau et al. | 455/3.02 |
| 2006/0075425 A1* | 4/2006 | Koch et al. | 725/32 |
| 2006/0075455 A1* | 4/2006 | Koch et al. | 725/135 |
| 2006/0105793 A1* | 5/2006 | Gutowski et al. | 455/518 |
| 2006/0173701 A1* | 8/2006 | Gurvey | 705/1 |
| 2006/0184960 A1* | 8/2006 | Horton et al. | 725/25 |
| 2006/0190616 A1* | 8/2006 | Mayerhofer et al. | 709/231 |
| 2006/0206582 A1* | 9/2006 | Finn | 709/217 |
| 2006/0229904 A1* | 10/2006 | Hunter et al. | 705/1 |
| 2006/0248209 A1* | 11/2006 | Chiu et al. | 709/231 |
| 2006/0291660 A1* | 12/2006 | Gehrmann et al. | 380/277 |
| 2007/0011704 A1* | 1/2007 | Anglin | 725/46 |
| 2007/0015457 A1* | 1/2007 | Krampf et al. | 455/3.06 |
| 2007/0016922 A1* | 1/2007 | Koch | 725/35 |
| 2007/0021099 A1* | 1/2007 | Sato | 455/404.1 |
| 2007/0047509 A1* | 3/2007 | Lee | 370/338 |
| 2007/0077921 A1* | 4/2007 | Hayashi et al. | 455/414.1 |
| 2007/0083897 A1* | 4/2007 | Brownell | 725/61 |
| 2007/0127472 A1* | 6/2007 | Yonemoto et al. | 370/390 |
| 2007/0129004 A1* | 6/2007 | Goldberg et al. | 455/3.06 |
| 2007/0130158 A1* | 6/2007 | LaBiche et al. | 707/10 |
| 2007/0130594 A1* | 6/2007 | Hidary et al. | 725/86 |
| 2007/0136741 A1* | 6/2007 | Stattenfield | 725/32 |
| 2007/0147274 A1* | 6/2007 | Vasa et al. | 370/310 |
| 2007/0155312 A1* | 7/2007 | Goldberg et al. | 455/3.06 |
| 2007/0157252 A1* | 7/2007 | Perez | 725/61 |
| 2007/0197160 A1* | 8/2007 | Health et al. | 455/3.05 |
| 2007/0240030 A1* | 10/2007 | Cronstrom | 715/500.1 |
| 2007/0248055 A1* | 10/2007 | Jain et al. | 370/331 |
| 2007/0250571 A1* | 10/2007 | Griffin | 709/204 |
| 2007/0254651 A1* | 11/2007 | Sasaki | 455/435.1 |
| 2007/0276740 A1* | 11/2007 | Hunter et al. | 705/26 |
| 2007/0279227 A1* | 12/2007 | Juels | 340/572.1 |
| 2007/0281606 A1* | 12/2007 | Baunach | 455/3.06 |
| 2007/0283008 A1* | 12/2007 | Bucher et al. | 709/224 |
| 2007/0286169 A1* | 12/2007 | Roman | 370/352 |
| 2007/0296805 A1* | 12/2007 | Tedenvall et al. | 348/14.01 |
| 2007/0300264 A1* | 12/2007 | Turner | 725/60 |
| 2007/0300268 A1* | 12/2007 | Sholtis | 725/86 |
| 2008/0005347 A1* | 1/2008 | Ott | 709/231 |
| 2008/0046352 A1* | 2/2008 | Jung et al. | 705/37 |
| 2008/0046929 A1* | 2/2008 | Cho et al. | 725/46 |
| 2008/0049704 A1* | 2/2008 | Witteman et al. | 370/342 |
| 2008/0086754 A1* | 4/2008 | Chen et al. | 725/105 |
| 2008/0098091 A1* | 4/2008 | Benco et al. | 709/219 |
| 2008/0109846 A1* | 5/2008 | Ewertz et al. | 725/37 |
| 2008/0117852 A1* | 5/2008 | Bennett et al. | 370/312 |
| 2008/0126420 A1* | 5/2008 | Wright et al. | 707/104.1 |
| 2008/0133923 A1* | 6/2008 | Sakamura et al. | 713/176 |
| 2008/0151888 A1* | 6/2008 | Ahmed | 370/390 |
| 2008/0163049 A1* | 7/2008 | Krampf | 715/700 |
| 2008/0163290 A1* | 7/2008 | Marko | 725/32 |
| 2008/0176507 A1* | 7/2008 | Brown et al. | 455/2.01 |
| 2008/0178230 A1* | 7/2008 | Eyal et al. | 725/86 |
| 2008/0184317 A1* | 7/2008 | Khedouri et al. | 725/86 |
| 2009/0012849 A1* | 1/2009 | Penrose Barton et al. | 705/10 |
| 2009/0030757 A1* | 1/2009 | Admon et al. | 705/7 |
| 2009/0061762 A1* | 3/2009 | Patsiokas et al. | 455/3.02 |
| 2009/0193478 A1* | 7/2009 | Jones | 725/105 |
| 2011/0143650 A1* | 6/2011 | Robinson | 455/3.02 |

* cited by examiner

| I like to listen to . . . | I'd like to broadcast . . . | My Broadcast Favorites | Browse Content |

Soft Rock
Hard Rock
'80s
'90s
R&B
Top 40
Comedy

| I like to listen to . . . | I'd like to broadcast . . . | My Broadcast Favorites | Browse Content |

Notify me via e-mail  ●

Notify me via text message  ○

Only notify me of new broadcasts with user rating greater than [ 2 ]  (1-5)

Only notify me of new broadcasts longer than [ 0.5 ] minute(s)

Only notify me of new broadcasts shorter than [ 5 ] minute(s)

DISTRIBUTION OF USER-GENERATED MULTIMEDIA BROADCASTS TO MOBILE WIRELESS TELECOMMUNICATION NETWORK USERS

BACKGROUND OF THE INVENTION

1. Field of the Invention

The present invention relates generally to wireless mobile telecommunication networks and, more specifically, to enabling subscribers to generate and distribute multimedia broadcasts to others.

2. Description of the Related Art

Some wireless mobile telecommunication network service providers offer their subscribers or users a multimedia content delivery service that the users can set up and customize using a Web-based user interface. For example, the MEDI-ANET service offered by Cingular Wireless allows users to access a Wireless Application Protocol (WAP) portal from their cellular telephones or other mobile wireless devices. Using a wireless device, the user can check e-mail accounts and obtain news, traffic and weather reports, sports scores, stock prices, flight times, movie listings, and other information, as well as download ringtones, games and graphics. A user can also access his or her MEDIANET account from a personal computer via the Internet to set up preferences regarding the type of content the user would like delivered to the wireless device and perform other operations.

Mobile wireless devices can include not only Web browsers that enable them to access services such as MEDIANET but also media players, such as the Microsoft WINDOWS MEDIA PLAYER, which enable them to download and play streaming audio and video content. Cingular Wireless offers its subscribers who have appropriate wireless devices a service known as CINGULAR VIDEO that, through an application program on the wireless device, enables the user to enter the address at which a media file is located and download and play the file. CINGULAR VIDEO also includes a feature that displays a notification when new or updated content is available.

Traditionally, news organizations, media outlets, and content aggregators (e.g., Web portals) have been the major sources of audio and video broadcast content accessible to users of portable electronic playback devices. More recently, using readily available software applications, individuals have been creating their own broadcast content and making the content available to interested persons. Such broadcast content is sometimes referred to as a "podcast," a term originally coined in reference to Apple Computer's IPOD personal digital media player but which is commonly used to refer generally to any digital audio or video recording that is made available on the Internet for downloading to a personal digital media player. Podcasting is an automatic mechanism whereby a podcaster posts content (i.e., podcasts) in the form of media files on a server computer, along with a feed file indicating the Internet address at which the media files can be accessed. The podcaster publishes the Internet address of the feed file so that interested persons can set up a content aggregator, such as that available through Apple Computer's ITUNES service, to monitor it. The content aggregator program allows a user to find and subscribe to feeds relating to content of interest to the user. For example, ITUNES allows a user to browse through content categories in which the user is interested, such as news, politics, comedy, etc., and select the feeds to which the user would like to subscribe. Under control of the content aggregator, the client computer automatically periodically downloads the feed files of the various podcasters to which the user subscribed. The feed files contain the Internet addresses of the podcasts (i.e., media files). As a podcaster creates and posts new podcasts, the podcaster updates the feed file to list the Internet addresses of the newly available podcasts. When the content aggregator detects changes in a feed file, it automatically downloads the most recently added media files. The user can then download the media files to an IPOD or other personal digital media player.

It would be desirable to provide a versatile method and system for distributing content to mobile wireless devices. It is to such a method and system that the present invention is primarily directed.

SUMMARY OF THE INVENTION

The present invention relates to a system and method for distributing subscriber-generated broadcasts to mobile wireless devices in a mobile wireless telecommunication network. In an exemplary embodiment of the invention, the network interacts with a subscriber to generate a broadcast representation that represents a compilation of one or more media content items, such as pre-recorded songs, the creator's recorded voice, sound effects, etc. The network stores the broadcast representation in a manner that allows it to be retrieved using a unique broadcast identifier. When the network receives the broadcast identifier from a user of a mobile wireless device, the network uses the broadcast identifier to retrieve the stored broadcast representation and transmit its associated media content to the mobile wireless device.

The user of the mobile wireless device can obtain the broadcast identifier by receiving it from the network on the device itself or on a computer or other suitable device. The subscriber can indicate preferences to the network regarding the genre of broadcast he or she is interested in listening to, so that the network sends only identifiers of broadcasts in that genre. Alternatively, the subscriber can obtain a broadcast identifier verbally or electronically from the person who created the broadcast.

It should be noted that although in the exemplary embodiment of the invention, described in further detail below, the illustrated network is of the GSM/UMTS type, the invention can be embodied in any other suitable wireless mobile telecommunications network technology.

DETAILED DESCRIPTION

In the following description, like reference numerals indicate like elements to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

Figure 1:
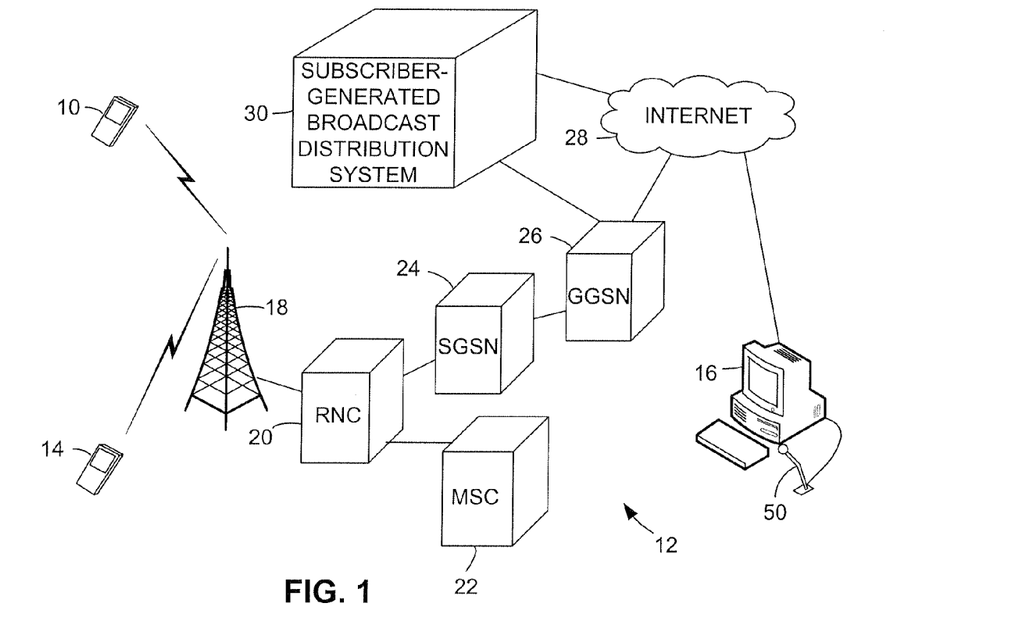
FIG. 1 is a block diagram of a wireless mobile telecommunications network in accordance with an exemplary embodiment of the present invention.

As illustrated in FIG. 1, in an exemplary embodiment of the invention, a subscriber to a mobile wireless telecommunication service can operate a mobile wireless device, such as user equipment (UE) 10, to communicate with the service provider's mobile wireless telecommunication network 12 and to engage in voice and data communication with other parties, such as a party operating UE 14, via telecommunication network 12. In addition, in accordance with the present invention, and as described in further detail below with regard to an exemplary instance of use of the system, a subscriber, using UE 10 or a computer 16, can also create and distribute what are referred to in this patent specification ("herein") as "broadcasts" to UE 14 and other such mobile wireless devices. The UE's 10 and 14 (and other mobile wireless devices that may similarly engage in communication but which are not shown for purposes of clarity) can be of any suitable type used in mobile wireless telecommunication systems, such as those commonly referred to as cellular telephones, handsets, mobile stations, wireless personal digital assistants (PDA's), etc.

In the exemplary or illustrated embodiment of the invention, the wireless telecommunication network is of the type known as Universal Mobile Telecommunication System (UMTS). Nevertheless, in other embodiments the network can be of any other suitable type. In accordance with the UMTS standard architecture, the network includes a number of base stations 18 (referred to as Node-B's in UMTS nomenclature), radio network controllers (RNC's) 20, a mobile switching center (MSC) 22, a Serving General Packet Radio Service (GPRS) Support Node (SGSN) 24, and a Gateway GPRS Support Node (GGSN) 26. As these network elements are well-understood in the art, they are not described in further detail herein except as they may specifically relate to the present invention. Other elements commonly included in such a network are not shown for purposes of clarity. Although only two UE's 10 and 14, one base station 18, and one RNC 20 are shown, persons skilled in the art to which the invention relates understand that such a wireless telecommunication network commonly includes many such UE's operated by various subscribers, and many such base stations, RNC's, etc. Also, although only one computer 16 is shown for purposes of clarity, it should be understood that subscribers can access various computers or other such devices (i.e., other than mobile wireless devices) that can communicate via the Internet 28 or similar network with mobile wireless telecommunication network 12. Similarly, the steps described below with regard to UE's 10 and 14 and computer 16 also apply to any other such devices that may be operated by other such subscribers. Note that UE's 10 and 14 are shown as communicating with the same base station 18 for purposes of clarity only, and each can communicate with any such base station with which it is in radio contact, in accordance with the conventional manner in which such wireless telecommunication networks are known to operate.

Figure 2:
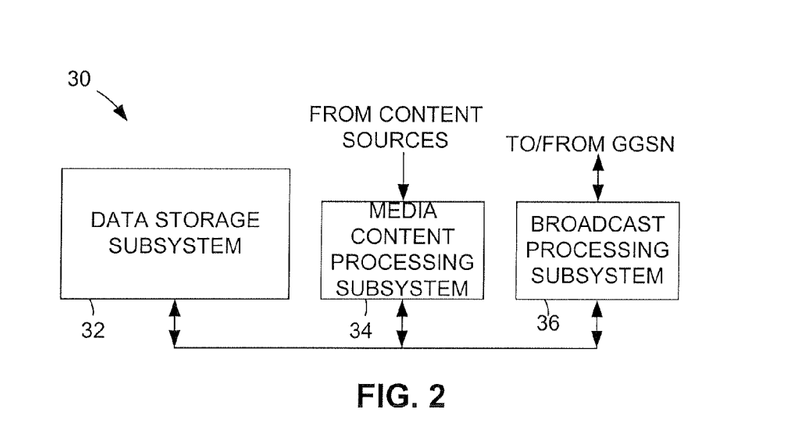
FIG. 2 is a block diagram of a user-generated broadcast distribution system of the telecommunications network of FIG. 1.

GGSN 26 not only couples wireless telecommunication network 12 to the Internet 28 in the conventional manner but also communicates with a novel subscriber-generated broadcast distribution system 30. Broadcast distribution system 30 provides the processing power and data storage for interacting with the subscriber to generate the broadcasts, store them, and distribute them, as described in further detail below. Accordingly, as illustrated in FIG. 2, broadcast distribution system 30 can comprise a data storage subsystem 32, a media content processing subsystem 34 and a broadcast processing subsystem 36.

Figure 3:
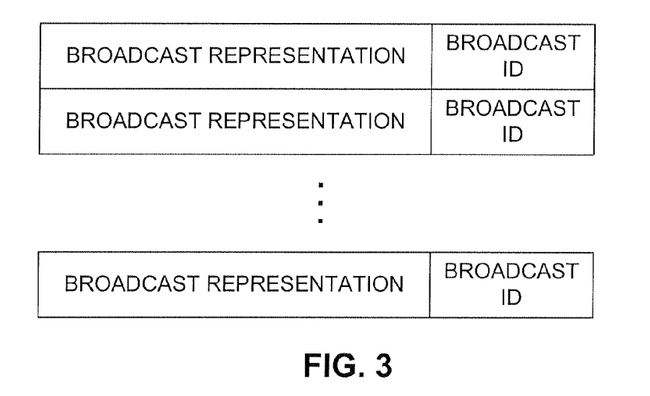
FIG. 3 illustrates the storage of broadcast representations and broadcast identifiers in the broadcast distribution system of FIG. 2.

As described below in further detail, a subscriber can create a broadcast by compiling one or more items of media content. The term "media content" as used herein includes within its scope segments of audio, video and similar media of the types that can be perceived by a user of a mobile wireless device. The media content can be pre-recorded, such as commercially available music (e.g., songs or instrumentals), narratives, and sound effects, or can be recorded by the user. As illustrated in FIG. 3, in the exemplary embodiment of the invention, the broadcast, once created, is stored in data storage subsystem 32 in the form of a broadcast representation. The broadcast representation can comprise the media content itself (e.g., in the form of MP3, MPEG, or other suitable audio or video file format) or a pointer or address at which the media content can be found, such as an Internet URL. As also described in further detail below, each broadcast representation is associated with a unique broadcast identifier so that the broadcast representation can be retrieved from data storage subsystem 32 through a look-up method. Although in the exemplary embodiment of the invention data storage subsystem 32, media content processing system 34 and broadcast processing system 36 are included in a standalone broadcast distribution system 30, in other embodiments of the invention these elements or their functional equivalents can be included in any other element or elements of network 12 or in any other suitable device or devices accessible to network 12.

As illustrated by the exemplary screen displays of FIGS. 4-11, broadcast distribution system 30 provides a graphical user interface through which it interacts with subscribers. For purposes of illustration, the screen displays of FIGS. 4-11 represent those that are displayed on computer 16. Accordingly, the manner in which the subscriber interacts with the user interface is described from the perspective of interacting with a computer, such as a personal desktop or laptop computer. Nevertheless, in other embodiments of the invention a similar user interface can be provided that is suitable for mobile wireless devices, such as UE's 10 and 14, and accordingly, the user interacts with such a user interface in a manner appropriate for a mobile wireless device. In the exemplary embodiment, broadcast distribution system 30 acts in a server-like manner with respect to computer 16, serving Web-based pages to a browser program executing on computer 16. In accordance with conventional Web-based protocols and window-based graphical user interface conventions, the user can read the displays, enter information into boxes, click on buttons to indicate selections, and so forth, to receive information from and transmit information to broadcast distribution system 30. The arrow in each of FIGS. 4-11 depicts a cursor, which the subscriber can manipulate using a mouse or other pointing device in the conventional manner.

Figure 4:
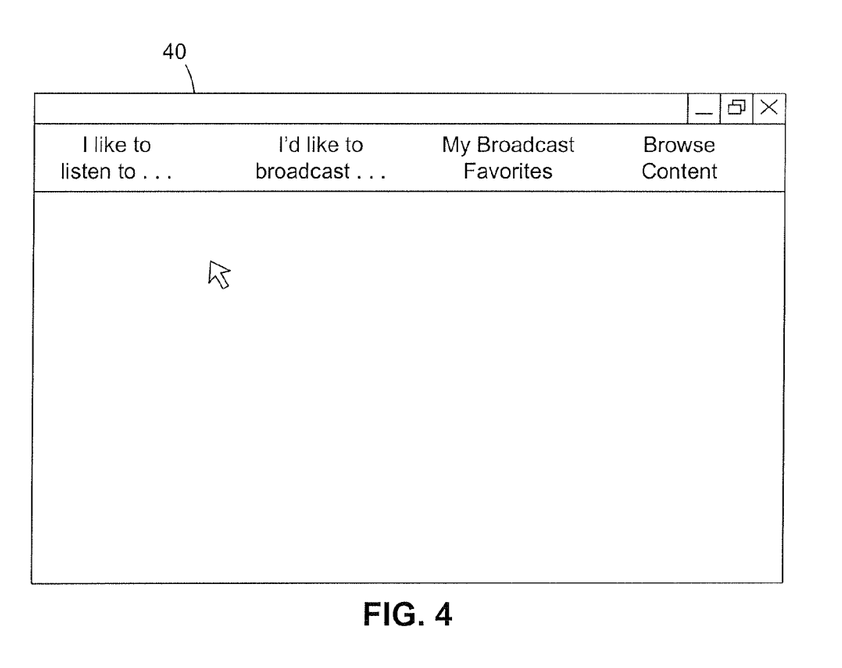
FIG. 4 depicts a main screen display of the user interface provided by the broadcast distribution system of FIG. 2.

As illustrated in FIG. 4, after subscribing to the service and setting up an account that enables the subscriber to log in to broadcast distribution system 30, a main screen display 40 is presented to the subscriber. Screen display 40 presents the subscriber with four options, labeled: "I like to listen to . . . ", "I'd like to broadcast . . . ", "My Broadcast Favorites", and "Browse Content." Using the mouse or other pointing device, the subscriber can select one of these options. Note that screen display 40, like the others of FIGS. 4-11, is intended only to be exemplary, and in other embodiments the screen displays can include any other suitable features.

Figure 5:
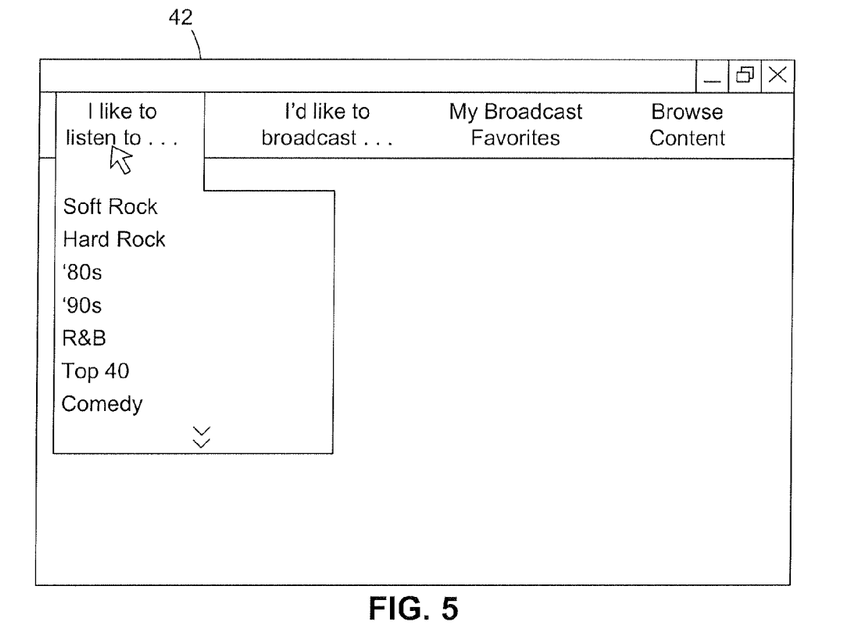
FIG. 5 depicts a user listening preferences screen display of the user interface provided by the broadcast distribution system of FIG. 2.

As illustrated in FIG. 5, selecting the "I like to listen to . . . " option causes a drop-down menu to appear in a screen display 42, listing several exemplary categories or genres of music or other pre-recorded audio content. The subscriber can select one of them to indicate a genre to which the subscriber enjoys listening. As described below, the information is used to advise the subscriber of broadcasts that other subscribers have created in the selected genre.

Figure 6:
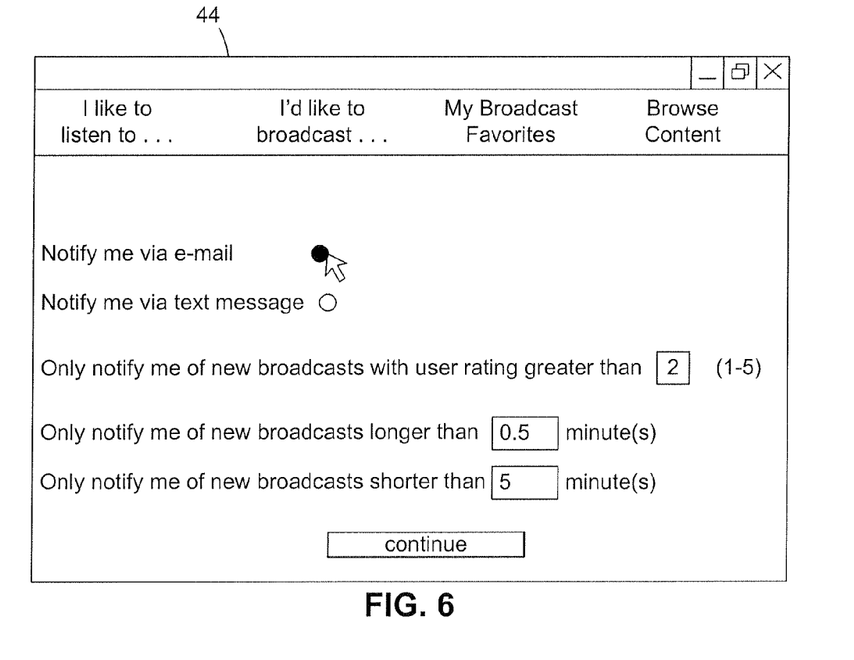
FIG. 6 depicts a further user listening preferences screen display of the user interface provided by the broadcast distribution system of FIG. 2.

After selecting a genre, the screen display 44 illustrated in FIG. 6 is presented to the subscriber. Screen display 44 allows the subscriber to choose various options for the method by which the subscriber chooses to be notified of newly created broadcasts in the genre as well as options for screening the broadcasts to notify the subscriber of only those meeting specified criteria. For example, by checking a corresponding box, the subscriber can indicate whether he or she wishes to receive notifications of newly created broadcasts in the selected genre via e-mail or via text message. The subscriber can also choose to be notified only of new broadcasts in the genre that are between a specified maximum and minimum number of minutes in length. The subscriber can also choose to be notified only of new broadcasts in the genre that have a rating above a specified threshold. As described below, subscribers are encouraged to rate others' broadcasts on a scale of 1-5.

Figure 7:
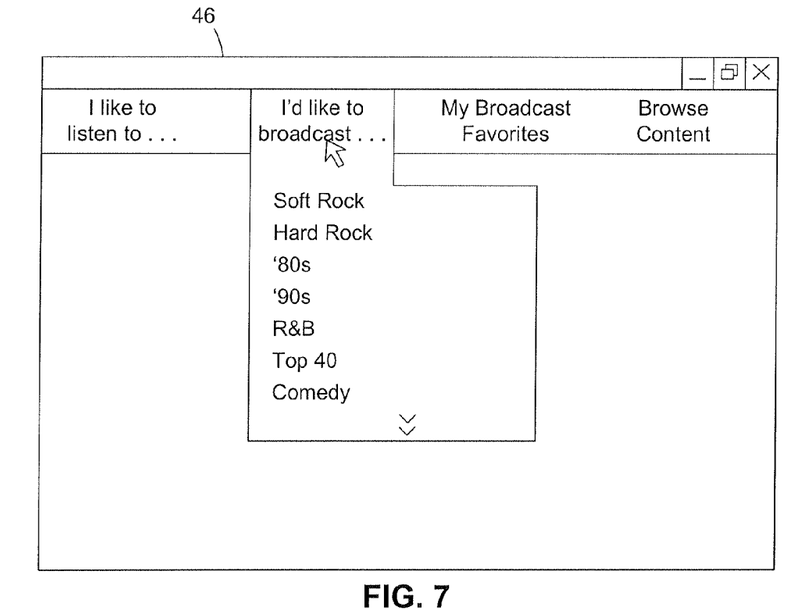
FIG. 7 depicts a broadcast creation screen display of the user interface provided by the broadcast distribution system of FIG. 2.

As illustrated in FIG. 7, selecting the "I'd like to broadcast . . . " option causes a drop-down menu to appear in a screen display 46, listing the exemplary categories or genres of music or other pre-recorded audio content. The subscriber can select one of them to indicate a genre that the subscriber believes best describes the broadcast that the subscriber is creating. As described below, the information is used to classify the broadcast so that other subscribers who have indicated a desire to listen to broadcasts in that genre can be notified of its existence once it has been created.

Figure 8:
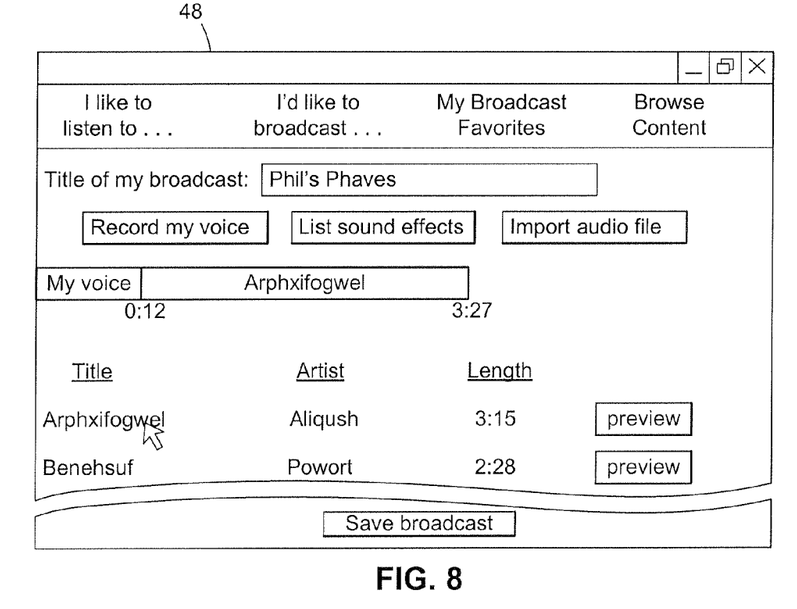
FIG. 8 depicts a further broadcast creation screen display of the user interface provided by the broadcast distribution system of FIG. 2.

After selecting a genre, the screen display 48 illustrated in FIG. 8 is presented to the subscriber. Screen display 48 allows the subscriber to create the broadcast by compiling segments of pre-recorded audio, pre-recorded sound effects or the subscriber's own voice or other sounds that the subscriber may record. A text box is provided into which the subscriber can type a title for the broadcast. A list of songs or other audio segments that are classified in the subscriber's selected genre (selected as described above with regard to FIG. 5) is displayed, with the title, recording artist, and length of each. A button is provided next to each song in the list on which the subscriber can click to "preview" the song, i.e., listen to a short segment of the song, so that the subscriber can decide whether to add it to the broadcast. In the exemplary embodiment of the invention, the number of songs the subscriber is allowed to include is limited to a maximum of three, but in other embodiments the user can be allowed to include up to any other suitable number. Similarly, the selections can be presented in any other suitable manner. The files representing the songs or other audio segments (e.g., in MP3 or other suitable audio file format) can be pre-stored in data storage subsystem 32 (FIG. 2) or can be obtained via the Internet 28 from another source. A button is also provided on which the subscriber can click to list a selection of sound effects, similar to the above-described song listing. Another button is provided on which the subscriber can click to initiate recording audio, such as the subscriber's voice, via a microphone 50 (FIG. 1) of computer 16. As the subscriber selects each audio item, such as a pre-recorded song, a recorded segment of the subscriber's voice, or a sound effect, it is added to the broadcast. Also, as the subscriber selects each audio item, it can be added to a timeline-like graphical representation of the broadcast compilation, in which each additional item is shown appended to the previously added item, along with the elapsed time (in minutes and seconds) at which each item begins and ends relative to the entire broadcast. As the manner in which the broadcast is created is intended only to be exemplary, in other embodiments of the invention other audio production features can be included, such as an option to mix the audio segments in various manners, such as to dub a voice track over a song. In some embodiments, a short commercial announcement can be inserted automatically before or after the subscriber's portion of the broadcast, as a means for the service provider to generate revenue to offset the cost of the service.

Figure 9:
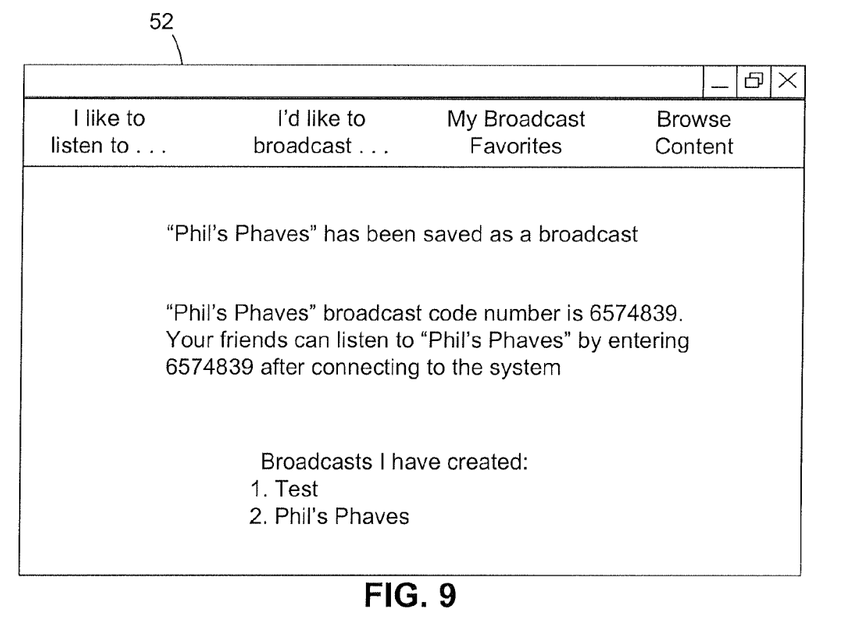
FIG. 9 depicts still another broadcast creation screen display of the user interface provided by the broadcast distribution system of FIG. 2.

When the subscriber clicks on a "Save Broadcast" button, broadcast distribution system 30 generates a unique broadcast identifier (ID) and stores the compilation and its broadcast ID in data storage subsystem 32 (FIG. 2) as described above. The broadcast ID can be any suitable number, alphanumeric string or other means for identifying the broadcast. Although in the exemplary embodiment the broadcast ID is intended to be perceptible by a user, so that a user can enter it manually into an electronic device, in some embodiments the broadcast ID can be transparent to the user. As illustrated in FIG. 9, a screen display 52 advises the subscriber that the broadcast has been saved and provides the broadcast ID. As described below, the subscriber or others to whom the broadcast ID is provided can listen to the broadcast by entering the broadcast ID. Screen display 52 can also list all the broadcasts that that subscriber has created.

Figure 10:
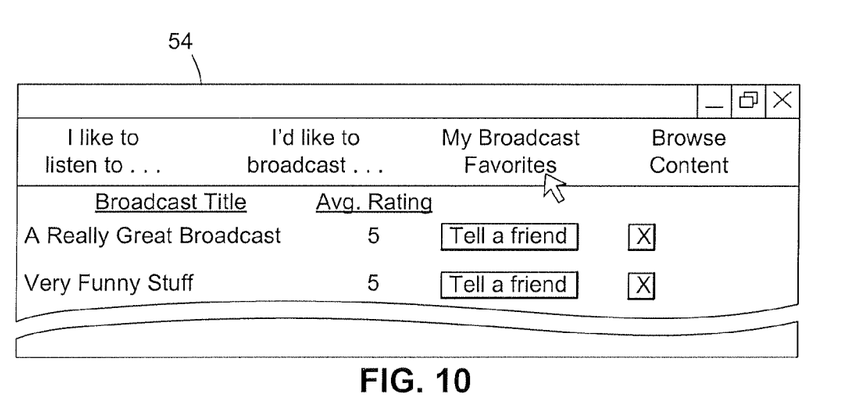
FIG. 10 depicts a user broadcast favorites screen display of the user interface provided by the broadcast distribution system of FIG. 2.

As illustrated in FIG. 10, selecting the "My Broadcast Favorites" option causes a list of broadcasts to be displayed in a screen display 54. The listed broadcasts are those that the subscriber has previously indicated are of interest, i.e., are favorites. Screen display 54 provides the title and user rating of each broadcast, although in other embodiments of the invention any other suitable information can be provided. A "Tell A Friend" button is also provided on which the subscriber can click to initiate a process by which the broadcast ID of the corresponding broadcast is transmitted as a text message or in another suitable format to another subscriber.

In this manner, the subscriber to whom the listed favorite broadcasts belong can let other subscribers know of the existence of a favorite broadcast. Although in the exemplary embodiment the subscriber can only notify others of individual broadcasts, in other embodiments a subscriber can notify others of the contents of the entire list or filter the notifications or recipients according to criteria the subscriber specifies.

Figure 11:
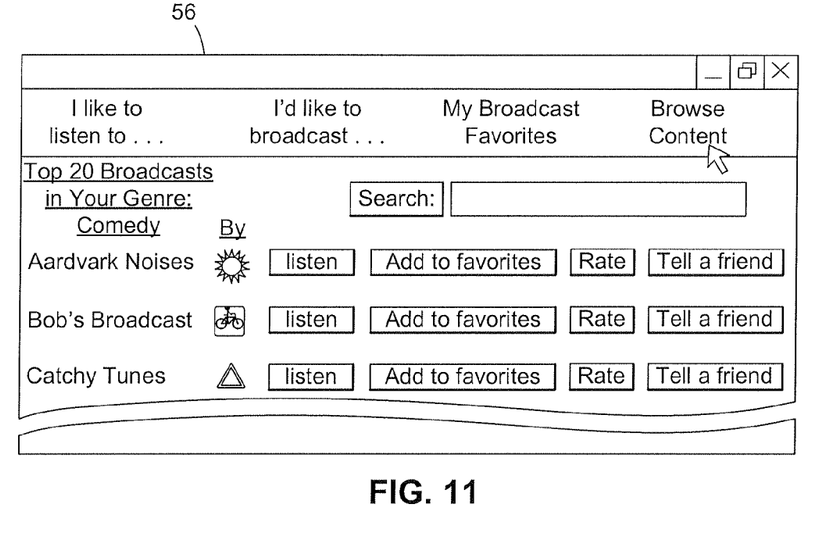
FIG. 11 depicts a broadcast content browsing screen display of the user interface provided by the broadcast distribution system of FIG. 2.

As illustrated in FIG. 11, selecting the "Browse Content" option causes a list of broadcasts to be displayed in a screen display 56. Although in the exemplary embodiment only the highest-rated 20 broadcasts that are classified in the subscriber's selected genre (selected as described above with regard to FIG. 5) are displayed, in other embodiments the broadcasts can be displayed according to any other suitable criteria. The listed broadcasts are those that have been created by the various subscribers to the service and stored by broadcast distribution system 30 in data storage subsystem 32 (FIG. 2) as described above. Screen display 56 provides the title of each broadcast along with the creator's name or avatar (i.e., a graphic or icon representing the creator), but in other embodiments of the invention any other suitable information can be provided. Also provided are buttons on which the subscriber can click to "Listen" to the broadcast, "Add to Favorites," "Rate" the broadcast, and "Tell A Friend." A box (not shown) in which a user can type a short comment on the broadcast can also be provided, and comments previously left by others can be displayed. One or more search boxes are provided in which the user can enter text to search for a broadcast by title, creator, rating, or content (e.g., a song title, recording artist, etc.). Also, a button or checkbox (not shown) can be provided through which the user can report offensive content to the service provider.

As noted above, although the actions depicted in FIGS. 4-11 relate to a subscriber creating broadcasts, indicating genre preferences and favorite broadcasts, and browsing created broadcasts using computer 16, similar actions can be performed by subscribers using mobile wireless devices, such as UE 10 or 14.

Figure 12:
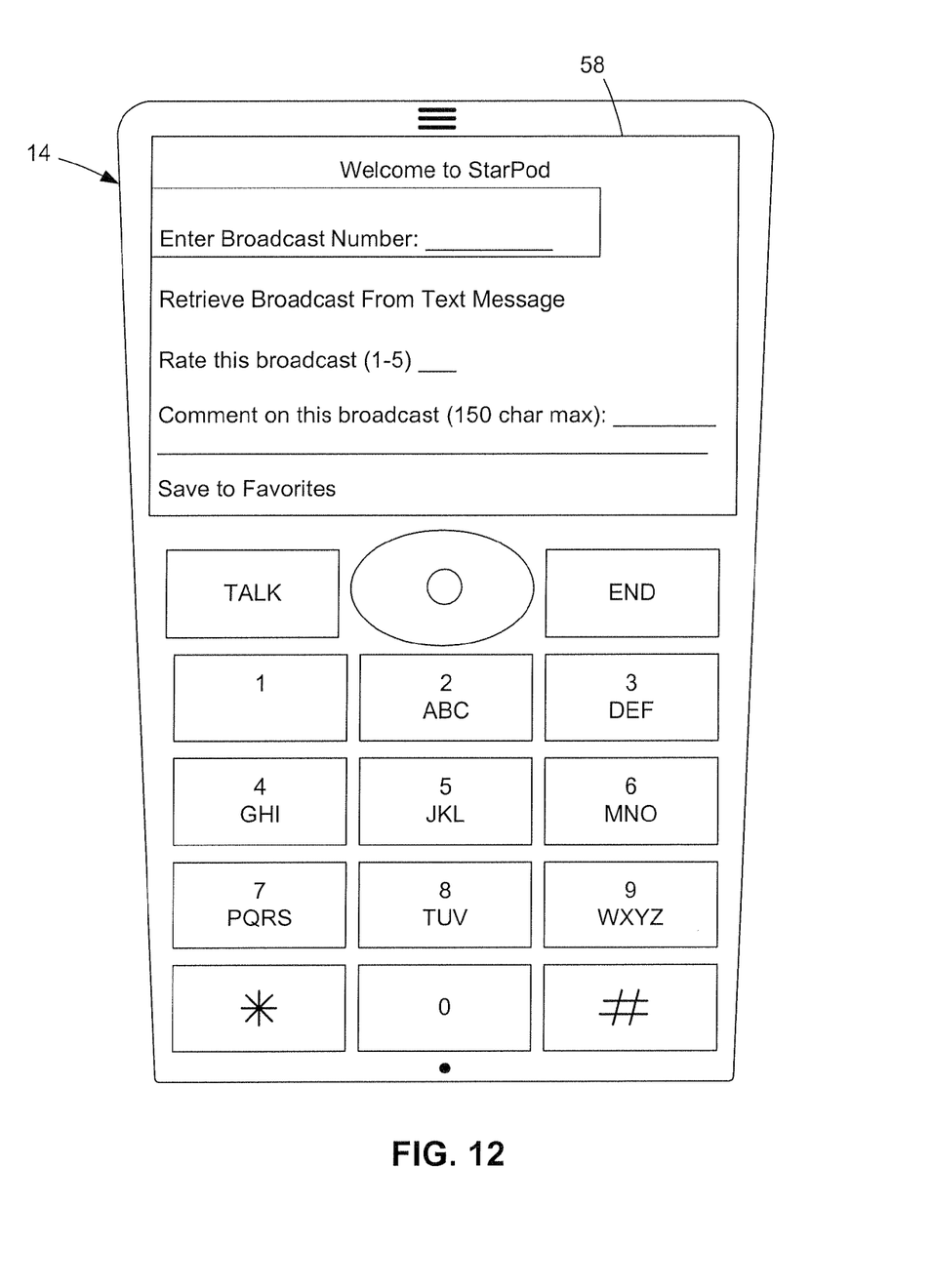
FIG. 12 depicts a broadcast request screen display of the user interface provided by the broadcast distribution system of FIG. 2.

Once a broadcast has been generated in the manner described above, anyone having a suitable mobile wireless device who has subscribed to the broadcast distribution service can listen to the broadcast. A subscriber can access the service by dialing a telephone number or entering a star code. As known in the art, a star code is a shorthand method of accessing a feature in a mobile wireless telecommunication system. For example, a system may allow a user to dial "*4" on the wireless device keypad to call a customer service representative. In accordance with the exemplary embodiment of the present invention, a subscriber can dial, for example, "*77" to cause the wireless device to access broadcast distribution system 30. As illustrated in FIG. 12 by the exemplary screen display 58 on UE 14, once broadcast distribution system 30 is accessed, the user interface prompts the subscriber to enter the broadcast ID of a broadcast to which the subscriber would like to listen. Alternatively, an option is provided for the user to cause UE 14 to retrieve the broadcast ID from a text message. As described above, in accordance with the subscriber's preferences, the subscriber can receive text message or e-mail notifications of newly created broadcasts relating to the genre that the subscriber selected. In response to the subscriber providing the broadcast ID, broadcast distribution system 30 retrieves the stored broadcast and transmits it in the form generally known in the art as streaming audio to UE 14, which plays the broadcast through the speaker. In embodiments of the invention in which broadcasts can include video, the wireless device plays the broadcast on the display screen.

The user is also given the option of rating the broadcast after listening to it. As described above, the user can assign a rating from "1" to "5" to the broadcast. This user is further given the option of leaving a short text comment that will appear when one browses broadcasts (e.g., FIG. 11). The user can also save the broadcast to the above-described favorites list associated with the account. As described above, the subscriber can access the favorites list through computer 16 as well as through UE 14 or other such device.

Figure 13:
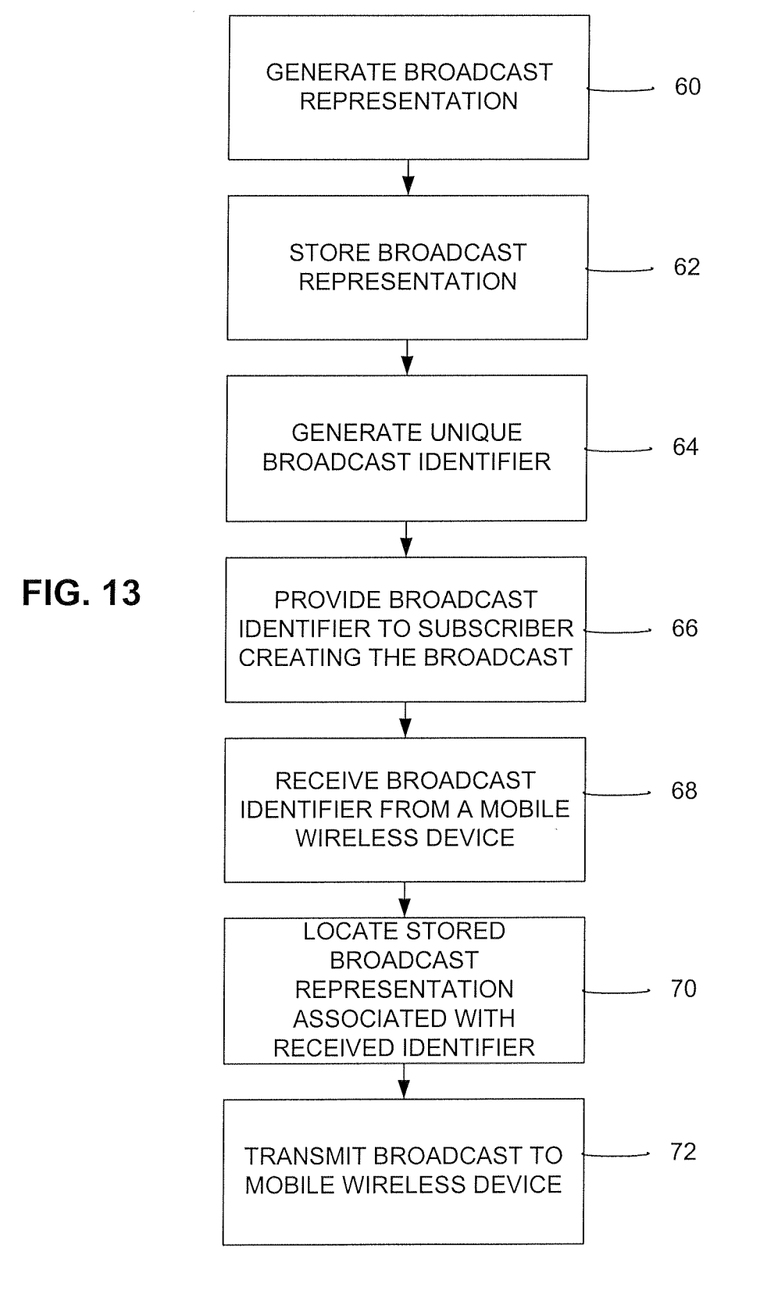
FIG. 13 is a flow diagram illustrating a method for distributing user-generated broadcasts in the telecommunications network of FIG. 1.

The above-described steps can be summarized as follows. Referring to FIG. 13, at step 60 a subscriber interacts with broadcast processing subsystem 36 (FIG. 2) to generate a broadcast representation. In generating the broadcast representation, broadcast processing subsystem 36 uses media content processing subsystem 34 to access media items, such as pre-recorded music. The media items can be pre-stored in data storage subsystem 32 or accessible via the Internet 28 or other suitable source. In interacting with the network in this manner, the subscriber can use computer 16 or, alternatively, a suitable mobile wireless device, such as UE 10. At step 62, broadcast processing subsystem 36 stores the broadcast representation in data storage subsystem 32. It also generates a unique broadcast identifier to associate with the stored broadcast representation, as indicated by steps 64-66.

As indicated by steps 68-72, once a broadcast identifier has been conveyed to another subscriber (e.g., by the subscriber who created the broadcast telling it to that person, or by broadcast processing subsystem 36 causing it to be electronically transmitted to another subscriber's computer or mobile wireless device), the broadcast identifier can be used to retrieve and play back the associated stored broadcast. For example, a subscriber can enter the broadcast identifier into his or her mobile wireless device, which transmits it to network 12 and, ultimately, broadcast distribution system 30.

When broadcast processing subsystem 36 receives the broadcast identifier from a user of the mobile wireless device, as indicated by step 68, it looks the broadcast identifier up in data storage subsystem 32 to determine if a broadcast representation having a matching broadcast identifier is stored, as indicated by step 70. If such a broadcast representation exists, broadcast processing subsystem 36 retrieves the stored broadcast representation and causes the broadcast to be transmitted in the form of streaming audio or video to the mobile wireless device, as indicated by step 72.

Persons skilled in the art to which the invention relates will readily be capable of programming or configuring the elements of broadcast distribution system 30 in view of the teachings herein. It should be noted that the steps described above with regard to FIG. 13 are intended only to be exemplary, and that other suitable methods will readily occur to persons skilled in the art in view of the teachings herein.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method comprising:
   receiving, by a server comprising a processor, a subscriber-generated media content from a subscriber device, the subscriber-generated media content being recorded via an input of the subscriber device and being associated with a subscriber-generated broadcast representation;

receiving, by the processor, a selection identifying a media content item to be associated with the subscriber-generated broadcast representation;

storing, by the processor, a broadcast representation comprising the subscriber-generated media content and the media content item;

associating, by the processor, the broadcast representation with a unique broadcast identifier;

receiving, by the processor, a request comprising the unique broadcast identifier from a mobile wireless device that is associated with a subscription for the subscriber-generated broadcast representation;

matching, by the processor, the unique broadcast identifier with the broadcast representation; and transmitting, by the processor, the media content item and the subscriber-generated media content associated with the broadcast representation to the mobile wireless device.

2. The method of claim 1, further comprising:
generating the unique broadcast identifier; and
providing the unique broadcast identifier to the subscriber device.

3. The method of claim 1, further comprising transmitting the unique broadcast identifier to the mobile wireless device.

4. The method of claim 1, wherein the media content item comprises a pre-recorded media content item selected from a list of a plurality of pre-recorded media content items.

5. The method of claim 1, wherein the media content item comprises a media content item stored on the subscriber device.

6. The method of claim 1, wherein the unique broadcast identifier is received from the mobile wireless device over a wireless network.

7. The method of claim 1, wherein the broadcast representation is streamed to the mobile wireless device.

8. The method of claim 1, further comprising:
receiving from the mobile wireless device an indication of a preferred content class; and
transmitting the unique broadcast identifier to the mobile wireless device if the broadcast representation with which the unique broadcast identifier is associated is in the preferred content class, wherein an indication of the preferred content class is received from the subscriber device and associated with the broadcast representation.

9. The method of claim 1, further comprising receiving from the mobile wireless device an indication of a user broadcast rating.

10. The method of claim 1, further comprising receiving from the mobile wireless device a request to forward the unique broadcast identifier to another device.

11. A system comprising:
a broadcast processing subsystem comprising a processor, and
a computer-readable medium that stores instructions that, when executed by the processor, cause the processor to perform operations comprising
receiving a subscriber-generated media content from a subscriber device, the subscriber-generated media content being recorded via an input of the subscriber device,
receiving a selection identifying a media content item to be associated with the subscriber-generated media content, storing, by the processor, a broadcast representation comprising the subscriber-generated media content and the media content item,
associating the subscriber-generated media content with a unique broadcast identifier,
receiving, from a mobile wireless device, a request specifying the unique broadcast identifier, the mobile wireless device being associated with a subscription for the subscriber-generated broadcast representation,
matching the unique broadcast identifier received from the mobile wireless device with the broadcast representation, and
transmitting the subscriber-generated media content and the media content item associated with the broadcast representation to the mobile wireless device.

12. The system of claim 11, wherein the instructions, when executed by the processor, cause the processor to perform operations further comprising:
generating the unique broadcast identifier; and
providing the unique broadcast identifier to the subscriber device.

13. The system of claim 11, wherein the instructions, when executed by the processor, cause the processor to perform operations further comprising transmitting the unique broadcast identifier to the mobile wireless device.

14. The system of claim 11, wherein the media content item comprises a pre-recorded media content item selected from a list of a plurality of pre-recorded media content items.

15. The system of claim 11, wherein the media content item is stored on the subscriber device.

16. The system of claim 15, wherein the input comprises an audio input.

17. The system of claim 11, wherein the instructions, when executed by the processor, cause the processor to perform operations further comprising receiving the unique broadcast identifier from the mobile wireless device over a mobile wireless network.

18. The system of claim 11, wherein the instructions, when executed by the processor, cause the processor to perform operations further comprising streaming the subscriber-generated media content and the media content item to the mobile wireless device.

19. The system of claim 11, wherein the instructions, when executed by the processor, cause the processor to perform operations further comprising transmitting the unique broadcast identifier to the mobile wireless device prior to receiving the unique broadcast identifier from the mobile wireless device.

20. The system of claim 19, wherein the instructions, when executed by the processor, cause the processor to perform operations further comprising:
receiving from the mobile wireless device an indication of a preferred content class; and
transmitting the unique broadcast identifier to the mobile wireless device if the subscriber-generated broadcast representation with which the unique broadcast identifier is associated is of the preferred content class, wherein a content class is received from the subscriber device associated with the subscriber-generated broadcast representation.

21. The system of claim 11, wherein the instructions, when executed by the processor, cause the processor to perform operations further comprising receiving from the mobile wireless device an indication of a user broadcast rating.

22. The system of claim 11, wherein the instructions, when executed by the processor, cause the processor to perform operations further comprising receiving from the mobile wireless device a request to forward the unique broadcast identifier to another device.

23. A non-transitory computer-readable medium having instructions stored thereon that, when executed by a processor, cause the processor to perform operations comprising:
- receiving a subscriber-generated media content from a subscriber device, the subscriber-generated media content being recorded via an input of the subscriber device;
- receiving a selection identifying a media content item to be associated with the subscriber-generated media content;
- storing a broadcast representation comprising the subscriber-generated media content and the media content item;
- associating the broadcast representation with a unique broadcast identifier;
- receiving a request that specifies the unique broadcast identifier from a mobile wireless device that is associated with a subscription for the subscriber-generated broadcast representation;
- matching the unique broadcast identifier received from the mobile wireless device with the broadcast representation; and
- transmitting the media content and the subscriber-generated media content associated with the broadcast representation to the mobile wireless device.

* * * * *